United States Patent [19]
Bertrand et al.

[11] Patent Number: 5,647,905
[45] Date of Patent: Jul. 15, 1997

[54] APPARATUS FOR COATING ICE CONFECTIONERY WITH PARTICULATE MATERIAL

[75] Inventors: Francis-Victor Bertrand, Laversines; Christian Mange, Beauvais, both of France

[73] Assignee: Nestec S.A., Vevey, Switzerland

[21] Appl. No.: 440,000

[22] Filed: May 12, 1995

Related U.S. Application Data

[62] Division of Ser. No. 243,816, May 17, 1994.

[30] Foreign Application Priority Data

Jun. 11, 1993 [EP] European Pat. Off. ............ 93109364

[51] Int. Cl.$^6$ ..................................... A23G 9/24
[52] U.S. Cl. ................... 118/16; 118/18; 118/24; 118/3.2; 99/494
[58] Field of Search ..................... 476/289, 291, 476/565, 660; 99/494; 118/13, 16, 17, 18, 24, 312

[56] References Cited

U.S. PATENT DOCUMENTS

| | | |
|---|---|---|
| 2,577,433 | 12/1951 | Robb . |
| 3,045,640 | 7/1962 | Hill et al. . |
| 3,695,346 | 10/1972 | Nichols ............... 165/120 |
| 3,759,218 | 9/1973 | Korstvedt . |
| 3,885,519 | 5/1975 | Orlowski . |
| 4,189,289 | 2/1980 | Getman ............... 425/93 |
| 4,199,603 | 4/1980 | Sortwell, III ............. 426/92 |
| 4,224,895 | 9/1980 | Launay . |
| 4,447,458 | 5/1984 | Roth et al. . |
| 4,497,244 | 2/1985 | Koppens . |
| 4,643,905 | 2/1987 | Getman ............... 426/565 |
| 4,662,306 | 5/1987 | Miller ............... 118/16 |
| 4,762,083 | 8/1988 | Wadell . |
| 4,808,423 | 2/1989 | Hansson . |
| 5,161,669 | 11/1992 | Gibson, Jr. ............. 198/499 |
| 5,195,454 | 3/1993 | Wodell ............... 118/16 |

FOREIGN PATENT DOCUMENTS

| | | |
|---|---|---|
| 0462309 | 12/1991 | European Pat. Off. . |
| 2099276 | 12/1982 | United Kingdom . |

*Primary Examiner*—Anthony J. Weier
*Attorney, Agent, or Firm*—Vogt & O'Donnell, LLP

[57] ABSTRACT

An apparatus for applying substances for coating articles of ice confectionery has a conveyor having an endless belt for transporting articles, and a refrigeration table is positioned below an upper run of the belt for cooling the upper run. A unit is provided for coating articles of ice confectionery with a fatty material and transporting the fatty-coated articles to the belt upper run. A unit for delivering particulate material is positioned above the endless belt upper run for delivering the material towards a position on the upper run above the refrigeration table for covering upper and side surfaces of articles transported on the upper run for forming a bed of particulate material about the articles for obtaining articles which are coated with particulate material and positioned within the bed. A further unit is positioned for separating particulate material of the bed from the coated articles and for recycling the separated particulate material.

14 Claims, 2 Drawing Sheets

APPARATUS FOR COATING ICE CONFECTIONERY WITH PARTICULATE MATERIAL

This application is a divisional application of application Ser. No. 08/243,816, filed May 17, 1994.

BACKGROUND OF THE INVENTION

This invention relates to production of articles of ice confectionery coated with a dry particulate material, more particularly in the form of flakes.

Articles of ice confectionery coated with solid particulate materials are generally made by machines comprising a conveyor belt for the individual ice portions, a feed hopper above the conveyor belt delivering a curtain of particulate material through which the portions pass and an element for recycling the particulate materials. The recycling element may be a bucket elevator or a trough-equipped drum through which the conveyor belt passes, as described for example in French Pat. No. 2 419 028 or U.S. Pat. No. 4,762,083. The use of moving parts to recycle the particles is not compatible with the coating of brittle particles of a certain size such as, for example, cereal flakes which have to be able to remain intact.

SUMMARY OF THE INVENTION

The problem addressed by the present invention was to coat an ice portion with a dry and brittle particulate material, more particularly cereal flakes, in such a way that the portion would be completely covered with particulate material over its upper surface and its sides and in such a way that the particulate material would retain its shape and its crispiness both in storage and on consumption.

A machine according to the invention is characterized in that it comprises a unit for precoating the upper surface and sides of ice confectionery portions with a liquid fatty composition, a particle application unit for forming a bed of particles surrounding the upper surface and the sides of the ice portions coated with fatty composition, and means for separating and recycling excess particles.

The present invention also includes a process for obtaining articles of ice confectionery coated with a particulate material which may be carried out by the machine of the present invention.

DETAILED DESCRIPTION OF THE INVENTION

The process according to the invention is characterized in that the frozen ice portion is precoated at least over its upper surface and its sides with a liquid fatty layer, in that the still soft fatty surface is uniformly covered with particulate material by surrounding the ice portion with a bed of solid particulate material, in that the articles to which the solid particulate material has adhered are separated from the free solid particulate material and in that the substantially intact particulate material is recycled so that it may be reused.

The expression "substantially intact" as applied to the particulate material means that most of the particulate material has remained intact and that any fines are eliminated, for example by means of a sieve, before the particulate material is reused. An embodiment of the invention, therefore, is characterized in that before the particulate material is recycled, it is freed from any fines present by sieving. The operation by which the fines are separated is preferred because their presence on the surface of the fatty layer could prevent the particles from adhering which would result in an uneven coating.

One embodiment of the process according to the invention is characterized in that the application of the particulate material on the fatty-coated article is accompanied by cooling the fatty-coated article and wherein during the cooling, the particulate material is applied prior to the solidification of the fatty coating at its surface so that the surface is tacky so that the particulate material adheres to the fatty coating surface.

Cooling may be effected by an embodiment of the machine according to the invention wherein the fatty coated article is transported on an endless belt and a refrigeration table is positioned between the upper and lower runs of the endless conveyor under the upper run for cooling the upper run.

In one preferred embodiment, the portions and the particulate material are coated with a liquid fatty layer so as to cover the upper surface, the sides and the butt of the articles.

Thus, the particulate material is completely surrounded by a coating which acts as a moisture barrier both with respect to the ice cream and with respect to the surrounding environment.

In one preferred embodiment, the machine according to the invention additionally comprises a final coating unit for coating the ice portions with a liquid fatty composition.

The invention is illustrated by the following detailed description of one particular embodiment of the machine according to the invention and its mode of operation given by way of example in conjunction with the accompanying drawings.

BRIEF DESCRIPTION OF THE DRAWING FIGURES

FIG. 1 diagrammatically illustrates the machine.

DETAILED DESCRIPTION OF THE DRAWING FIGURES

Figure 1:
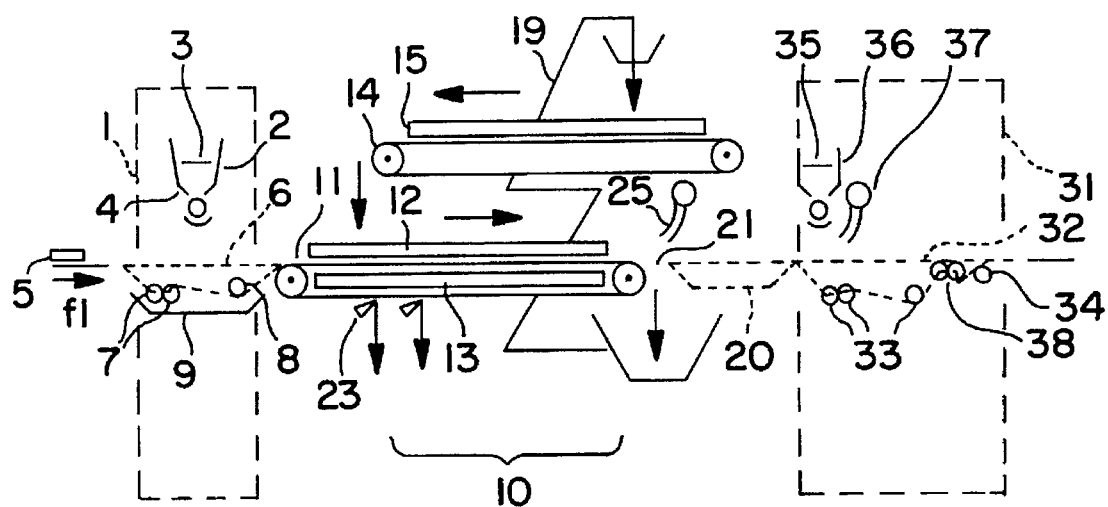

The machine according to the invention, as illustrated in the drawing Figures, is an integral part of an installation comprising—upstream of the machine—a horizontally circulating conveyor belt onto which is extruded a continuous strand of ice confectionery which is frozen, for example in a freezing tunnel, and then cut into portions. The portions are then taken up by a conveyor belt circulating at a higher speed than the first conveyor belt so that the portions are spaced. The temperature of the portions is preferably −35° C. or lower. These operations are carried out conventionally and have not been illustrated.

Referring to FIG. 1, the precoating unit 1 comprises a feed hopper 2 for liquid composition 3, for example a chocolate-flavoured coating, thermostatically controlled to around 38° C. by means of a heating fluid, for example water circulating through a double wall of the hopper. On leaving the hopper, the liquid 3 passes by gravity through an adjustable slot 4 positioned radially in relation to the direction of travel f1 of the portions 5. As it leaves the slot, the liquid composition is distributed into a curtain of chocolate-flavoured coating.

The portions 5 are taken up by the lattice belt 6 and passed beneath the liquid curtain of chocolate-flavoured coating discharged through the slot-like nozzle where they are precoated on their upper surface and their sides. The lattice belt 6 is kept under tension by the tension rollers 7 and cleaned by the licking shaft 8 which preferably rotates in the opposite direction to the direction of travel of the belt 6 and which is arranged on its return level. A trough 9 collects the liquid coating which may be recycled to the hopper 2, for example by means of a pump (not shown). On leaving the precoating unit, the portions are transferred to the particle application unit.

Figure 2:
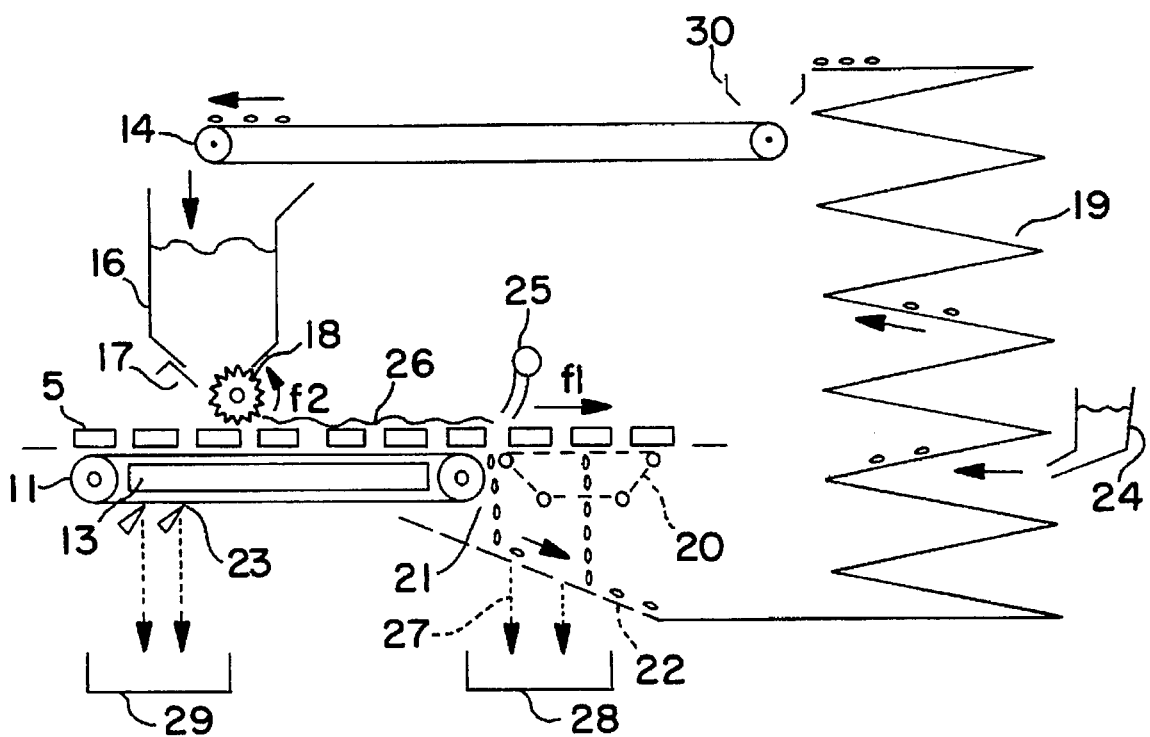
FIG. 2 illustrates the particle application unit.

As shown in FIGS. 1 and 2, the particle application unit 10 comprises a solid endless conveyor belt 11 which is designed to circulate horizontally from left to right and which takes up the precoated portions on its upper run level. The belt 11 is delimited by two vertical guides 12 on either side so that the belt and the guides form a U-shaped channel. Arranged below and in contact with the upper level of the belt 11 is a refrigeration table 13 thermostatically controlled by a fluid, for example glycol-containing water, to a temperature of approximately −20° C. or lower. The function of the table 13 is to solidify the small amount of liquid coating which drops onto the belt and to keep the portions 5 cold. Above the belt 11, the unit 10 comprises a solid conveyor belt 14 which is designed to circulate horizontally from right to left and which is provided with vertical guides 15 forming a U-shaped channel with the belt 14. The belt 14 could be replaced by a vibrating chute. A hopper 16 is arranged between the belts 11 and 14. The hopper 16 comprises a flap 17 and a smooth roller 18 of which the functions will be explained in detail hereinafter.

The unit 10 also comprises an elevator consisting of a vibrating screw 19. The unit 10 further comprises a table 20 formed by self-cleaning rotating roller on which the leading edge is spaced from the trailing edge of the belt 11, for example by a distance of 2 to 4 cm, which defines a dropping space 21. Below the space 21 and the table 20, a perforated plate 22 acting as a sieve collects the particulate material which is directed towards the vibrating screw 19. At the end of its return run level, the belt 11 is scraped by means of blades 23. At an intermediate level, the vibrating screw is fed with new particulate material by the hopper 24. A blower 25 is arranged above the space 21.

In operation particulate material 26 is discharged from the hopper 16 at position above the refrigeration table 13 onto and around the portions 5 transported by the upper run of the belt 11. The portions 5 are thus immersed in a bed of particulate material while their upper surfaces and sides are precoated with chocolate-flavoured coating which is still tacky, i.e. has not yet solidified at its surface. The amount of particulate material discharged determines the thickness of the bed on the belt 11, the desired thickness being of the order of 4 cm. The rate of discharge is regulated by the more or less large opening of the flap 17 and the speed of rotation of the smooth roller 18 which rotates in the direction of the arrow f2, i.e. in the direction of the rotating axes of the belt 11. On leaving the belt 11, the particulate material which has not adhered to the portions drops into the space 21 and through the openings in the lattice belt 20 driven by the blower 25. The fines 27, if any, formed by the breakage of the particles pass through the perforated plate 22 acting as a sieve and are removed in the plate 28. The particulate material intended to be recycled is elevated by the vibrating screw 19 to the level of the belt 14. The remains scraped off by the blades 23 are removed in the plate 29. To compensate for consumption and losses, new particulate material is discharged from the hopper 24 into the vibrating screw 19. At the top of the vibrating screw, the particulate material is discharged through the hopper 30 onto the belt 14 and then transported towards the hopper 16.

On leaving the application unit 10, the portions 5 are completely coated over their upper surfaces and their sides with substantially intact particulate material.

The particulate material may be selected from the dry and brittle ingredients typically used as additions in confectionery and in chocolate making, such as pieces of cooked sugar, nougatine, dried or preserved fruits and expanded or extruded cereals, more particularly flakes, for example of rice.

The process and machine according to the invention are advantageous in the case of additions consisting of relatively brittle flat particles of a certain size or any other particulate material of corresponding dimensions and brittleness.

A particularly preferred particulate material consists, for example, of flakes of rice in the form of cooked and toasted petals 2 to 8 mm in size which are brittle and absorb moisture. This material is susceptible to loss of crispiness through hygroscopy, a quality which is considered to be crucial from the organoleptic point of view. It is for this reason that, in one preferred embodiment of the process and machine according to the invention, the portions are completely coated with a fatty composition acting as a moisture barrier.

In this embodiment, the portions issuing from the application unit 10 are transferred to the coating unit (FIG. 1) for applying liquid fatty composition, for example chocolate-flavoured coating, on the lattice belt 32. The belt 32 is driven and kept under tension by tension rollers 33 and cleaned along its return level by the licking shaft 34. The coating composition 35, for example a chocolate-flavoured coating at approximately 35° C., is applied in the form of a curtain from the thermostatically controlled hopper 36 to the upper surface and the sides of the portions in the same way as for the precoating unit 1, the coating is spread and excess coating is removed by means of the blower 37. The unit 31 also comprises scraped rollers 38 both rotating in the same direction of which the function is to form and maintain a wave of chocolate-flavoured coating which enables a butt of coating to be applied.

On leaving the unit 31, the coated portions are conducted towards a cooling station and packing station, for example of the "flow-pack" type (not shown).

In the interests of simplicity, the production of articles in the shape of bars arranged in a line has been schematically illustrated in the accompanying drawings. However, the process and machine according to the invention may of course also be used in the same way for treating individual articles differing in shape, such as "bite-size" articles for example. The portions may be arranged in rows in several lines.

The machine according to the invention is of course controlled by a programmable automatic control unit which drives the various conveyor belts in synchronism with one another, with the elements for distributing the coating materials and with the upstream extrusion, cooling and cutting stations and the downstream cooling and wrapping stations.

Figure 3:
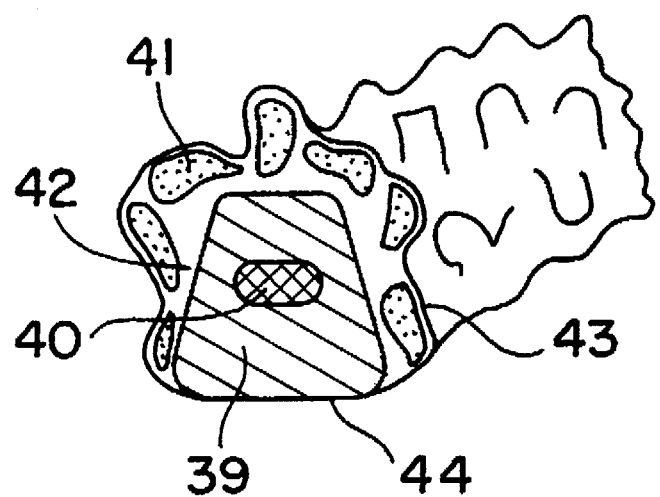
FIG. 3 is a perspective cross-sectional view of an article of ice confectionery obtained by one particular embodiment of the process according to the invention.

The article capable of being produced by the process and the machine according to the invention, which is illustrated in FIG. 3, comprises a co-extruded core of ice cream flavoured with vanilla 39 and caramel 40 coated with toasted flakes of rice 41 between two layers of milk chocolate 42 and 43 on its upper surface and its sides and a butt of milk chocolate flavoured coating 44.

We claim:

1. An apparatus for coating an article of ice confectionery with particulate material comprising:

a coating unit comprising members for transporting articles of ice confectionery and for applying a liquid fatty material onto surfaces of the transported articles;

a conveyor comprising an endless belt which has an upper article transport run and a lower return run spaced apart one from the other and which is positioned for receiving articles from the unit for transporting the articles on the upper run;

a refrigeration table positioned below the belt upper run for cooling the upper run;

means positioned above the belt upper run for delivering a particulate material towards the upper run at a position on the upper run above the refrigeration table for covering upper and side surfaces of articles transported on the upper run with the particulate material for forming a bed of particulate material about the articles for obtaining articles which are coated with particulate material and positioned within the bed;

means positioned for separating the particulate material of the bed from the coated articles to recover excess particulate material; and means for recycling the excess particulate material to the particulate material delivery means.

2. An apparatus according to claim 1 further comprising an additional coating unit comprising members positioned for receiving particulate coated articles from the separation means and for applying a liquid fatty material to the coated articles.

3. An apparatus according to claim 1 wherein the recycling means comprises a vibrating screw elevator.

4. An apparatus according to claim 1 or 3 wherein the separating means comprises a lattice belt which has openings therein for particulate material to fall therethrough and which is positioned for receiving and transporting coated articles transported from the endless belt and wherein the lattice belt is positioned so that the lattice belt is separated from the endless belt by a space for the excess particulate material to fall between the endless belt and lattice belt.

5. An apparatus according to claim 4 further comprising a blower positioned for blowing the excess particulate material into the space between the endless and lattice belts.

6. An apparatus according to claim 4 further comprising a perforated plate positioned beneath the space between the endless belt and the lattice belt for removing fines from the excess particulate material to obtain a fines-reduced particulate material and for delivering the fines-reduced particulate material to the recycling means.

7. An apparatus according to claim 1 or 3 wherein the separating means comprises a unit comprising rollers positioned for receiving and transporting coated articles transported from the endless conveyor and wherein the roller unit is positioned so that the roller unit is separated from the endless belt by a space for the excess particulate material to fall between the endless belt and roller unit.

8. An apparatus according to claim 7 further comprising a sieve positioned beneath the space between the endless belt and the roller unit for removing fines from the excess particulate material to obtain a fines-reduced particulate material and for delivery of the fines-reduced particulate material to the recycling means.

9. An apparatus according to claim 1 further comprising a blade positioned beneath the lower run for contacting the endless belt for scraping the endless belt.

10. An apparatus according to claim 1 or 3 wherein the coating unit member for transporting the frozen confectionery articles is a lattice belt and the coating unit member for appyling the fatty liquid is a hopper for delivering a curtain of the fatty liquid.

11. An apparatus according to claim 1 wherein the means for delivering the particulate material to the endless belt comprises a further conveyor belt.

12. An apparatus according to claim 11 wherein the recycling means is positioned for delivering particulate material to the further conveyor belt.

13. An apparatus according to claim 1 wherein the particulate material delivery means comprises a vibratable chute.

14. An apparatus according to claim 3 wherein the elevator is positioned for delivering particulate material to the vibratable chute.

* * * * *

UNITED STATES PATENT AND TRADEMARK OFFICE
CERTIFICATE OF CORRECTION

PATENT NO. : 5,647,905
DATED : July 15, 1997
INVENTOR(S) : Francis-Victor BERTRAND, et al.

It is certified that error appears in the above-indentified patent and that said Letters Patent is hereby corrected as shown below:

Column 1, line 4, insert the heading:
       --CROSS REFERENCE TO RELATED APPLICATION--.

Column 4, line 27, after "unit" insert --31--.

Signed and Sealed this

Eighteenth Day of November 1997

Attest:

BRUCE LEHMAN

*Attesting Officer*      *Commissioner of Patents and Trademarks*